United States Patent Office 3,364,619
Patented Jan. 23, 1968

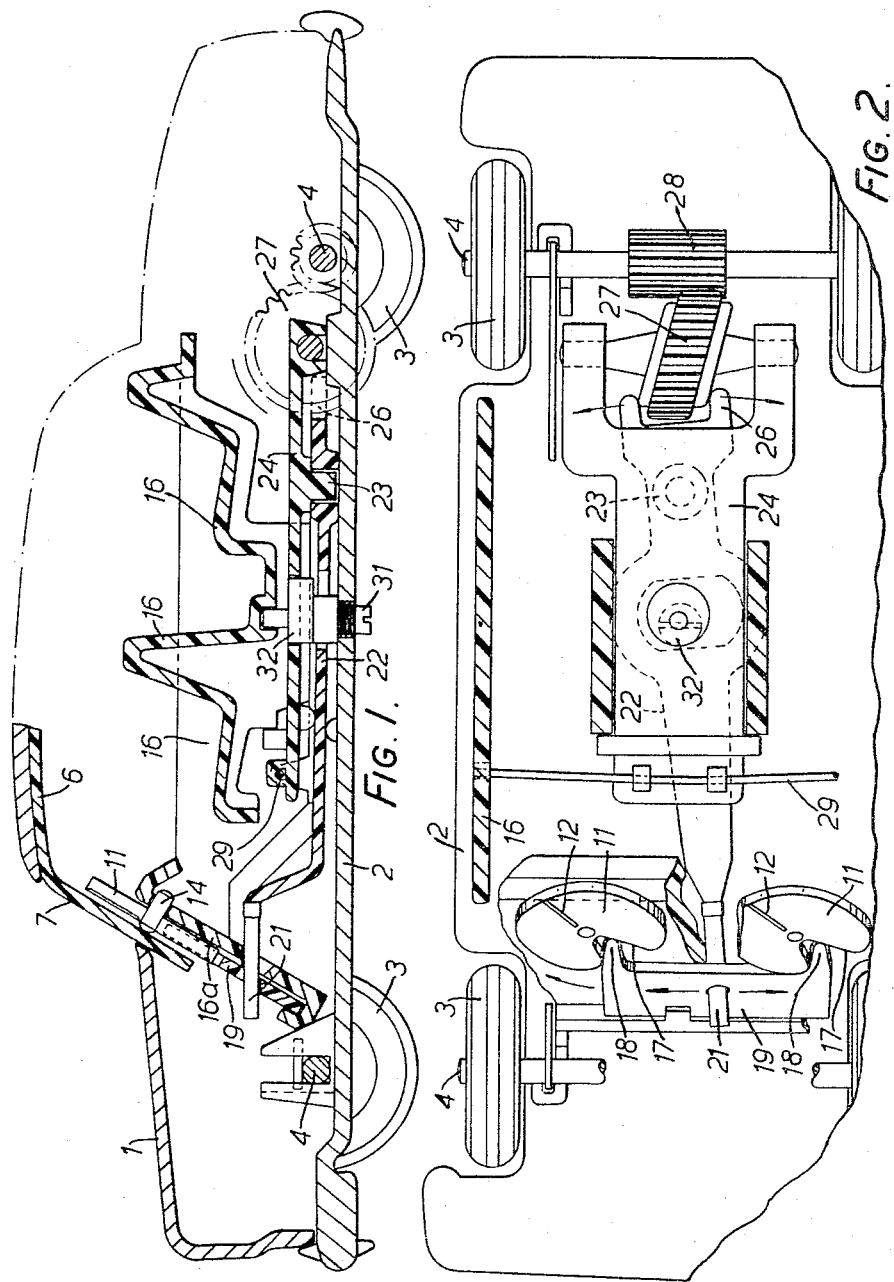

3,364,619
TOY VEHICLES
Marcel Rene Van Cleemput, Kislingbury, England, assignor to The Mettoy Company Limited
Filed June 7, 1965, Ser. No. 461,992
Claims priority, application Great Britain, July 8, 1964, 28,133/64
5 Claims. (Cl. 46—204)

ABSTRACT OF THE DISCLOSURE

The invention relates to small scale model vehicles, and provides an improved construction for simulating movable windshield wipers. The wipers are simulated by radial marks on transparent plates, which are mounted in or close to the plane of the windshield, and are subjected to angular oscillation by a simple linkage driven by one or the other of the ground wheels of the vehicle. The drive mechanism may comprise a gear pinion mounted on an axle of the vehicle, a gear wheel driven by the pinion and having camming surfaces inclined to the axis of rotation of the gear wheel, these surfaces engaging in a forked end of a horizontal lever pivoted about a vertical axis intermediate the ends of the lever. The other end of the lever engages a horizontal slide and oscillates the slide laterally, and projections on the slide engage the pivoted transparent plates so as to impart the desired angular oscillation to them.

---

This invention relates to model vehicles of the type having a transparent windshield.

The invention is particularly concerned with the provision, in such a vehicle, of means simulating a windshield wiper.

According to the invention a windshield wiper is represented by a radial mark on a flat transparent member which is pivotally mounted in or close to the plane of the windshield and which is mechanically oscillated about its pivot.

The windshield itself may be engraved or otherwise marked so as to appear spotted with rain, the radial mark which represents the windshield wiper appearing in and sweeping a clear sector of the screen.

A preferred form of model vehicle in accordance with the invention is described below, by way of example only, with reference to the accompanying drawings, in which:

FIGURE 1 is a sectional elevation, and

FIGURE 2 is a part sectional plan, various parts being omitted or broken away for clarity.

The model vehicle shown in the drawings includes an opaque, hollow, die-cast body 1 closed from below by a die-cast, plate-like chassis 2, and supporting wheels 3 carried by axles 4. The body is formed with openings positioned to represent windows and a windshield, and a moulded member 6 of clear synthetic resin material simulates glazing in these openings, thereby constituting a windshield 7.

Located close behind the windshield 7 are two flat, generally circular members 11, each having a radial mark 12, which may for example be formed by engraving and filling with paint, the members being pivotally mounted at their centres. The members 11 are arranged to be oscillated by a drive mechanism (fully described below) which is actuated by rotation of the rear supporting wheels 3 and axle 4 of the vehicle. The windshield 7 is preferably engraved or otherwise marked in order to appear spotted with rain, but is provided with two clear sectors through which the radial marks 12 appear, the sectors matching the arc of movement of the members 11.

The members 11 are freely rotatably mounted by pivots 14 upon the front wall 16A of an interior moulding 16 which is shaped to represent the front and rear seats of the vehicle. Each of the members is formed with a notch 17 receiving a tongue 18 projecting from the upper edge of a cross-slide 19 which is mounted for transverse sliding movement on the front wall 16A of the moulding 16. The cross-slide 19 is formed with an aperture receiving a pin 21 forwardly projecting from the front end of an arm 22, which is mounted intermediate its ends by a vertical pivot 23 on a main slide 24. A fork 26 at the rear end of the arm 22 embraces a gear 27 which is rotatably supported by the main slide and whose flanks are parallel with each other and inclined to the transverse horizontal rotary axis of the gear, which is thus adapted to act as a cam member for rocking the arm 22 about its vertical pivot 23. For driving the gear 27, a pinion 28 is fast with the rear axle 4 and supporting wheels of the vehicle.

The main slide 24, which is longitudinally movable relative to the body 1 and chassis 2, is spring biassed by a rod spring 29 to its illustrated, rear position in which the gear 27 is engaged with the driving pinion 28, but can be moved forwardly by means of a vertical cam pin 31 which is journalled in the chassis and in the interior moulding 16 and which carries an eccentric 32 engaging in a hole in the main slide.

In operation, with the parts in their illustrated positions, the vehicle can be moved over a flat surface to rotate the wheels 3 and the rear axle 4, so that the pinion 28 drives the gear 27. Continuous, uni-directional rotation of the gear 27 causes the arm 22 to be reciprocated laterally about its pivot 23; the pin 21 drives the cross-slide 19 to and fro, and the tongues 18 oscillate the rotary members 11 about their pivots 14, so that the radial marks 12 appear as windshield wipers operating on the windshield. If it is desired to disconnect the drive to the members 11, the cam pin 31 is turned through half a revolution from its illustrated position, moving the main slide 24 forward, against the action of spring 29, to carry the gear 27 out of engagement with the pinion 28.

Many variations in the precise details of the above described embodiment would be possible without departing from the scope of the invention as defined in the appended claims. For example, the rotary members 11, instead of being positioned close behind the windshield, could be positioned in the plane of the windshield, which would of course be formed with apertures to receive the members.

I claim:

1. A model vehicle including a transparent windshield, a flat transparent member pivotally mounted adjacent the plane of the windshield, the member carrying a radial mark representing a windshield wiper, and mechanical means for oscillating the said member about its pivot.

2. A model vehicle including a transparent windshield, a flat, generally circular, transparent member, which is pivotally mounted at its centre, adjacent the windshield and which carries a radial mark representing a windshield wiper, and a drive mechanism which oscillates the said member about its pivot, the said mechanism being actuated by rotation of an axle carrying a pair of supporting wheels.

3. A model vehicle in accordance with claim 2, wherein the windshield is engraved or otherwise marked to appear spotted with rain, but has a clear sector in which the radial mark appears.

4. A model vehicle comprising body, a transparent windshield, a flat, generally circular, transparent member pivotally mounted at its centre close to the plane of the windshield and carrying a radial mark representing a windshield wiper, a rotatable axle carrying vehicle supporting wheels, and a drive mechanism actuated by rotation of said axle to produce oscillation of said transparent member about its pivot, said mechanism including a rotary cam member mounted for rotation about an axis parallel with the said axle and adapted to be coupled to said axle for rotation in response to rotation of the axle, said cam being inclined to its own rotary axis, an arm pivoted intermediate its ends, one end engaging said cam whereby rotation of said cam produces lateral, reciproca:ing, rocking movement of said arm, and a cross slide engaged by the opposite end of said arm, said cross slide being coupled to said transparent member to effect oscillation thereof.

5. A model vehicle in accordance with claim 4, wherein the said arm and cam member are carried by a slide which is adjustable in the longitudinal direction of the vehicle to connect or disconnect, as desired, the cam member and a driving member.

References Cited
UNITED STATES PATENTS 2,665,520  1/1954  Staccone _____ 46—204

LOUIS G. MANCENE, *Primary Examiner.*
C. R. WENTZEL, *Assistant Examiner.*